United States Patent [19]

Trougouboff

[11] Patent Number: 5,036,929
[45] Date of Patent: Aug. 6, 1991

[54] APPARATUS FOR HANDLING HEAVY LOADS SUCH AS A TROLLEY OR A ROLLING CHAIR FOR THE HANDICAPPED

[76] Inventor: Emile Trougouboff, 15 bis, Avenue de Curti, Saint Maur des Fosses, France

[21] Appl. No.: 490,600
[22] PCT Filed: Jul. 28, 1989
[86] PCT No.: PCT/FR89/00399
§ 371 Date: May 21, 1990
§ 102(e) Date: May 21, 1990
[87] PCT Pub. No.: WO90/00997
PCT Pub. Date: Feb. 8, 1990

[30] Foreign Application Priority Data

Jul. 28, 1988 [FR] France .................. 88 10199

[51] Int. Cl.⁵ .................................. B62B 5/02
[52] U.S. Cl. ........................... 180/8.2; 180/282;
180/907; 280/5.22
[58] Field of Search ........... 414/921; 180/8.2, 282, 180/907; 280/5.22, 5.28

[56] References Cited

U.S. PATENT DOCUMENTS

| 2,482,203 | 9/1949 | Peterson et al. | 180/907 X |
| 2,692,652 | 10/1954 | Wilson | 180/282 X |
| 3,231,036 | 1/1966 | Appenrodt | 280/5.22 X |
| 3,259,202 | 7/1966 | Griffeth | 180/282 X |
| 3,869,011 | 3/1975 | Jensen | 280/5.22 X |
| 4,109,740 | 8/1978 | Andruchiw | 280/5.22 X |
| 4,125,169 | 11/1978 | Harris et al. | 180/907 X |
| 4,222,449 | 9/1980 | Feliz | 180/8.2 |
| 4,556,229 | 12/1985 | Bihler et al. | 280/5.22 |
| 4,566,707 | 1/1986 | Nitzberg | 280/5.22 X |
| 4,674,584 | 6/1987 | Watkins | 280/5.22 X |

FOREIGN PATENT DOCUMENTS

| 1024367 | 2/1958 | Fed. Rep. of Germany | 280/5.22 |
| 1405732 | 5/1969 | Fed. Rep. of Germany | .- |
| 1088980 | 3/1955 | France | . |
| 1533242 | 7/1968 | France | . |
| 2527155 | 11/1983 | France | . |
| 1230619 | 5/1971 | United Kingdom | 180/907 |
| 2184988 | 7/1987 | United Kingdom | 180/907 |
| 2188889 | 10/1987 | United Kingdom | 180/907 |

*Primary Examiner*—Robert J. Spar
*Assistant Examiner*—Robert S. Katz
*Attorney, Agent, or Firm*—Sandler, Greenblum & Bernstein

[57] ABSTRACT

An apparatus for handling heavy loads, such as a wheelchair for the handicapped, wherein a raising/lowering device is equipped with an inclination sensor cooperating with a safety device for stopping the device if a predetermined inclination is exceeded.

9 Claims, 1 Drawing Sheet

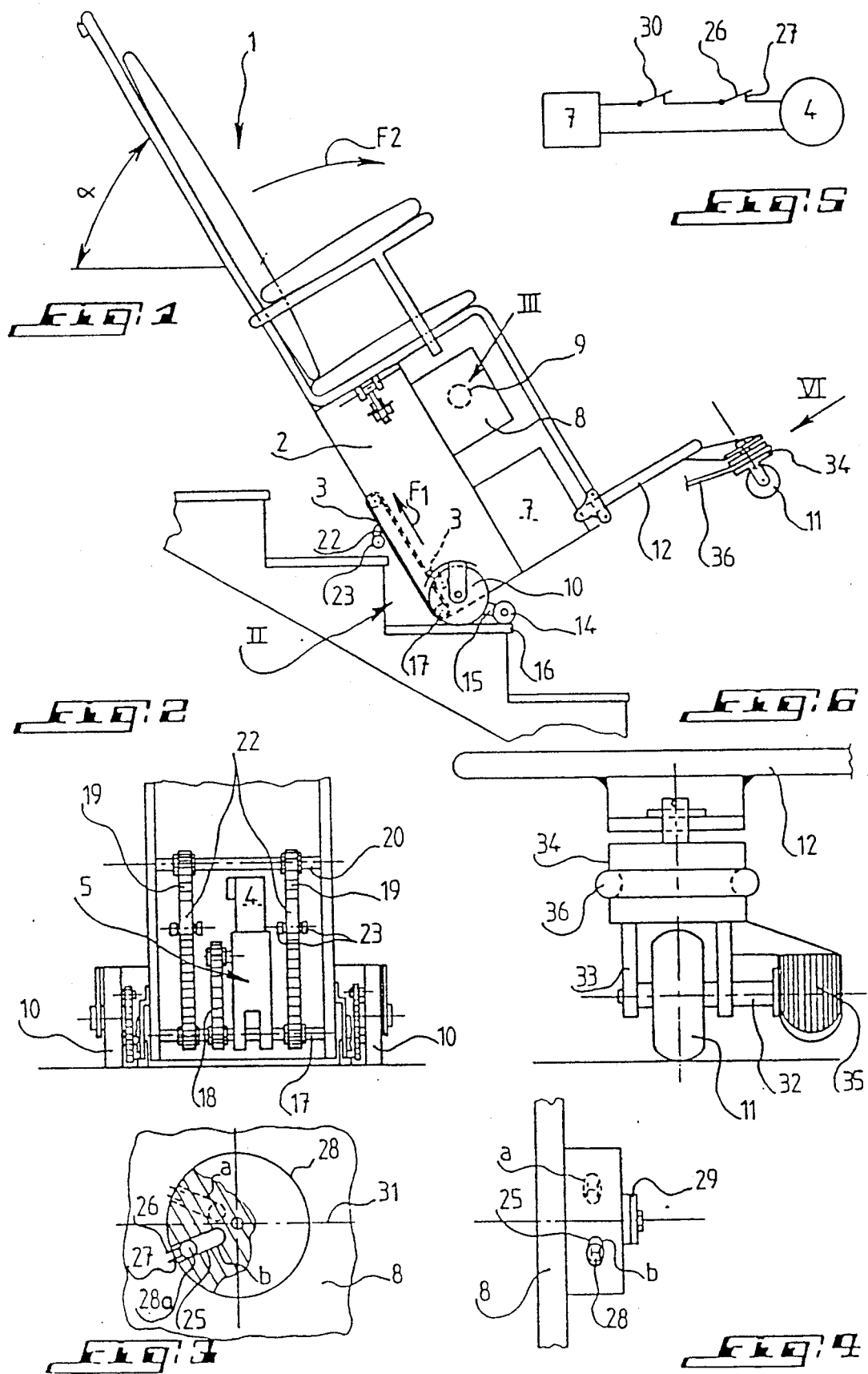

APPARATUS FOR HANDLING HEAVY LOADS SUCH AS A TROLLEY OR A ROLLING CHAIR FOR THE HANDICAPPED

BACKGROUND OF THE INVENTION

1. Field of the Invention

The invention concerns apparatus for handling heavy loads, such as a hand-truck or a wheelchair for the handicapped, over a surface with discontinuities such as steps. The invention is equipped with a raising/lowering device on steps that comprises a motor driving the raising/lowering device and during the operation of this device, forces the apparatus to pivot about a horizontal axis.

2. Description of Background

Known apparatus of this kind as a rule will be operated by one person who, when going up or down one or more steps of a staircase, keeps the apparatus in an inclined position, advantageously near the equilibrium position in order to lower the load the person is bearing. The raising/lowering device in the known apparatus is located at the rear of the apparatus' wheels, on the side of the person manoeuvering the chair. When going up a staircase, these means tend to impart a forward pivoting motion to the apparatus, that is, in the downward direction of the staircase. Where a wheelchair for the handicapped is concerned, then the handicapped person when seated in the chair is in danger falling.

SUMMARY OF THE INVENTION

The object of the present invention is to create an apparatus which shall be free of these serious drawbacks.

To achieve this goal, the apparatus of the invention comprises an apparatus-inclination sensor and a device for stopping the raising/lowering means which is controlled by the sensor when a predetermined inclination has been exceeded.

In one advantageous feature of the invention, the sensor comprises an element inside a case and is movable between an open and a closed electric-contact position as a function of the apparatus inclination, said case being affixed to the apparatus at a predetermined slope relative to a reference plane.

In another advantageous feature of the invention, the sensor is mounted in a support on the apparatus rotatable about a horizontal axis in order to allow changing the slope of the case.

In yet another feature of the invention, the above support is a roller and the sensor is a mercury-drop inclination detector advantageously placed inside a radial borehole in the roller, the borehole starting at the roller's periphery.

DESCRIPTION OF DRAWINGS AND PREFERRED EMBODIMENTS

The invention and other purposes, features, details and advantages shall be described further in the illustrative description below in relation to the attached schematic drawings which are provided in purely didactic manner and show an embodiment mode of the invention.

FIG. 1 is a schematic sideview of a wheelchair for handicapped, of the known type, which is equipped with the systems of the invention, FIG. 2 is a cutaway of the wheelchair of FIG. 1 in the direction of arrow II, FIG. 3 is a view on a larger scale and with cutaway of the detail denoted by III in FIG. 1.

FIG. 4 is a sideview of the device shown in FIG. 3,

FIG. 5 is functional diagram of the power supply to the motor driving the raising/lifting device of the invention, and FIG. 6 is a schematic of a guidance system for the apparatus of the invention.

FIG. 1 shows, as an illustrative example of apparatus for handling heavy loads, a wheelchair 1 for the handicapped on a staircase. An assembly 2 in the space underneath the seat houses a raising/lowering device denoted as a whole by 3, a motor 4 driving the device 3 by a transmission means 5, a storage battery 7 providing the electric power to the motor 4 and a case 8 enclosing both the electrical connections and the inclination sensor, schematically indicated in FIG. 1 by 9.

It is further shown that the chair moves by means of two side wheels 10 at bottom of the assembly 2 and by a steerable wheel 11 at the front of the chair below the component 12 acting as stepping board, and between the wheels 10. Each wheel 10 is associated with a step-edge detector consisting of a roller 14 at the end of a pivoting arm 15. The step-edge detector is capable of locking the wheel 10 against rotation when this arm is beyond the edge 16 of a step.

The raising/lowering device 3, the transmission means 5 and the step-edge sensor are known from the French patent number 2,527,155. The device 3 shall be described only briefly in relation to FIGS. 1 and 2.

By means of a transmission chain 18, the motor 4 drives into rotation a shaft 17. The shaft 17 is horizontal in the chair frame, approximately at the level of the axles of the wheels 10 but is offset to the rear as shown by FIG. 1. On each side of the chair the shaft 17 drives an endless chain 19 which at the upper part winds around a pinion on a shaft 20 parallel to but above the shaft 17, inside the assembly 2. Two studs 22 each bearing two coaxial and juxtaposed rollers 23, located on either side of the chain 19, are mounted at equal distance on each chain. The studs 22 project to the outside in such a way that the rollers can come to rest against the fore part of a step. As shown by FIG. 1 in this respect, when the chains move in the direction indicated by the arrow F1, the rollers 23, resting against the step, cause the chair to rise. Similarly, when the rollers rest on the step and the chains move in the inverse direction of the arrow F1, the chair shall descend. In the course of such ascending or descending motion of the chair, and considering that the chair's center of gravity does not coincide with the axis of the rollers, this chair would pivot about rollers 23 if the chair were not held in a suitably inclined position by the person handling the chair, in the manner known per se. When the raising/lowering device causes the chair to ascend with the chains 19 moving in the direction of the arrow F1, the chair shall be subjected to a torque tending to pivot it in the direction of the arrow F2.

The present invention concerns means for averting accidents from the above-noted pivoting by stopping the raising/lowering device when the inclination of the wheelchair exceeds a predetermined angle. These means include an inclination sensor 9 which is stationary on the wheelchair, for instance inside the case 8, in the manner shown in FIG. 1. In the illustrative embodiment shown in the Figures, the inclination sensor is a mercury drop type sensor. This sensor comprises an oblong ampule 25 having at one end two electric contacts 26, 27 and inside which is a mercury drop 28. This drop moves inside the ampule between a position away from the contacts 26, 27 as shown in FIG. 3 by the dash lines being at a, and a contact-closing position, shown in solid lines, at b. In the example shown by FIGS. 3 and 4, the ampule 25 is located within a suitable radial borehole in a roller 28 beginning at the roller periphery. This roller 28 is mounted so as to allow angular variation, on the inside fixed wall of the case 8, around a horizontal axis. In FIG. 4, 29 denotes means for locking the roller 28 into a predetermined angular position.

As shown in FIG. 5, it will be noted that the contacts 26, 27 are in series with a switch 30 actuated by the person moving the wheelchair, and with the electric power circuit of the motor 4 for driving the raising/lowering device 3 by means of the battery 7. In the electric diagram shown, once the inclination of the wheelchair 1 exceeds a predetermined value corresponding to the horizontal line 31 of FIG. 3, the contact between the elements 26, 27 of the sensor 3—which normally is closed—will open, so that the power to the motor 4 is shut off. Thus, the raising/lowering device 3 is stopped regardless of the position of the switch 30, that is, even if the person operating the wheelchair keeps this contact closed. It is easily seen that as a result, in light of the stoppage of the raising/lowering device, the pivoting motion—which might not be controlled by the person operating the wheelchair—has been stopped.

To program the inclination angle α of the wheelchair 1 at which the inclination sensor 9 must stop the motor 4, the wheelchair is placed at that inclination and the roller 28 is made to rotate until the axis of the ampule 25 coincides with the horizontal line 31.

FIG. 6 schematically shows another feature of the present invention, allowing control of the front wheel 11 steering. This wheel 11 is rigidly joined to a shaft 32, which rotates in supports 33, themselves fixed underneath a collar 34, which rotates underneath the wheelchair stepping-board 12 about an axis perpendicular to the plane of the stepping board. The collar 34 also supports a motor 35, for instance an electric motor, which may be powered from the battery 7. This motor is arranged in such a way that it can drive the shaft 32 into rotation. This shaft 32 may be the output shaft of the motor 35. At its periphery, the collar 34 is provided with one or more peripheral grooves through which passes a cable 36, so that by pulling on either of the two ends of cable 36, the collar shall rotate in either direction. The ends of the cable 36 may be affixed to manual control means illustratively located at the level of the wheelchair armrests so that the wheelchair user himself can control the orientation of the wheel 11. Where called for, the user also has access to the control means for the wheel 11.

Obviously many modifications may be introduced in the above described wheelchair without thereby transcending the scope of the invention. Illustratively the inclination detector might of any other suitable and known species.

What is claimed is:

1. An apparatus for handling heavy loads, over discontinuous surfaces, said apparatus comprising a step raising/lowering device comprising at least a pair of endless chains, wherein each said chain further comprises at least one stud which bears two coaxial and juxtaposed rollers located on either side of said chain, said device further comprising an electric drive motor for said raising/lowering device, that, in the course of operation said drive motor drives said raising/lowering device, so that said raising/lowering device, imparts to said apparatus a pivoting force about a horizontal axis,
   wherein said apparatus further comprises an inclination sensor for detecting said apparatus inclination with respect to said horizontal axis, and means for stopping said raising/lowering device, said means for stopping being controlled by said sensor, when a predetermined inclination with respect to said horizontal axis of said apparatus is exceeded.

2. An apparatus as claimed in claim 1, wherein said inclination sensor comprises a movable element moving as a function of said apparatus inclination with respect to said horizontal axis between a closed position in contact with a set of electric contacts and an open position with said set, said set of contacts being inserted in an electric power circuit feeding said motor driving said raising/lowering device.

3. An apparatus as claimed in claim 2, wherein said sensor comprises a case inside which said set of electric contacts is present at one end of the path of said movable element, said case being affixed to said apparatus at a predetermined inclination relative to a reference plane.

4. An apparatus as claimed in claim 3, wherein said case is mounted on a support said support being mounted on said apparatus and rotatable about a horizontal axis.

5. An apparatus as claimed in claim 4, wherein said support is a roller and said inclination sensor comprises a mercury drop which is advantageously placed inside a radial borehole in said roller.

6. An apparatus as claimed in claim 2 wherein said set of contacts is present in said electric power supply circuit of said motor and in series with a switch acting as the drive means of the raising/lowering device.

7. An apparatus as claimed in claim 1 wherein said apparatus is provided with a stepping board and a front steerable wheel having a wheel axis of rotation, said steerable wheel being mounted underneath said stepping board and pivoting about an axis perpendicular to said wheel axis of rotation, and wherein the pivoting motion of said wheel is manually controlled and said wheel is driven in rotation by a separate motor, wherein said apparatus further comprises an energy source which powers said separate motor.

8. An apparatus as claimed in claim 7, wherein bearings of a drive shaft of said steerable wheel are integrated into a set of supports which are rigidly joined to a collar of controlled angular position mounted in a rotatable manner underneath said stepping board, said drive motor for said wheel being affixed to said collar.

9. An apparatus as claimed in claim 7, wherein a collar may be angularly steered using cables, wherein said collar and said cables are adapted for controlling said steerable wheel.

* * * * *